(12) United States Patent
Maag et al.

(10) Patent No.: US 9,565,806 B2
(45) Date of Patent: Feb. 14, 2017

(54) MANUALLY ACTUATED SCISSORS

(75) Inventors: Markus Maag, Neu-Ulm (DE); Bernhard Reh, Laichingen (DE)

(73) Assignee: HUSQVARNA AB, Huskvarna (SE)

( * ) Notice: Subject to any disclaimer, the term of this patent is extended or adjusted under 35 U.S.C. 154(b) by 765 days.

(21) Appl. No.: 13/318,397

(22) PCT Filed: May 3, 2010

(86) PCT No.: PCT/EP2010/002673
§ 371 (c)(1),
(2), (4) Date: Nov. 1, 2011

(87) PCT Pub. No.: WO2010/127814
PCT Pub. Date: Nov. 11, 2010

(65) Prior Publication Data
US 2012/0047750 A1    Mar. 1, 2012

(30) Foreign Application Priority Data
May 5, 2009   (DE) .................. 10 2009 019 989

(51) Int. Cl.
*A01G 3/02*    (2006.01)
*B26B 13/26*   (2006.01)
*B26B 13/28*   (2006.01)

(52) U.S. Cl.
CPC ............... *A01G 3/02* (2013.01); *B26B 13/26* (2013.01); *B26B 13/285* (2013.01)

(58) Field of Classification Search
CPC . A01G 3/02; A01G 3/021; B26B 17/00–17/02
USPC ......... 30/188, 190, 250, 251, 266, 340, 341; 81/60–62, 63.1, 63.2, 318, 384
See application file for complete search history.

(56) References Cited

U.S. PATENT DOCUMENTS

| 3,273,240 | A |   | 9/1966  | Florian |        |
|-----------|---|---|---------|---------|--------|
| 3,390,455 | A | * | 7/1968  | Florian | 30/251 |
| 3,851,389 | A | * | 12/1974 | Swanson | 30/250 |
| 4,176,450 | A | * | 12/1979 | Muromoto| 30/251 |
| 4,186,484 | A | * | 2/1980  | Tanaka  | 30/251 |
| RE30,613  | E | * | 5/1981  | Nakamura et al. | 30/251 |
| 4,312,127 | A | * | 1/1982  | Tanaka  | 30/250 |
| 4,368,577 | A | * | 1/1983  | Babb    | 30/251 |
| 4,674,184 | A |   | 6/1987  | Anderson|        |
| 5,511,314 | A | * | 4/1996  | Huang   | 30/251 |
| 5,718,051 | A | * | 2/1998  | Huang   | 30/250 |
| 5,761,815 | A | * | 6/1998  | Lin     | 30/251 |

(Continued)

FOREIGN PATENT DOCUMENTS

| DE | 1553692     | 1/1967 |
| DE | 102007031145| 1/2009 |
| DE | 202009001893| 4/2009 |

OTHER PUBLICATIONS

International Search Report and Written Opinion of PCT/EP2010/002673 filed May 3, 2010.

(Continued)

*Primary Examiner* — Jason Daniel Prone
(74) *Attorney, Agent, or Firm* — Nelson Mullins Riley & Scarborough LLP

(57) ABSTRACT

For manually actuated shears with a ratchet mechanism it is proposed to provide an additional lever that circumvents the ratchet mechanism and enables the operation of the shears in a direct cut mode in which a single closing process of the handle levers also causes complete closing of the blade arrangement.

11 Claims, 3 Drawing Sheets

(56) References Cited

U.S. PATENT DOCUMENTS

Figure 1:
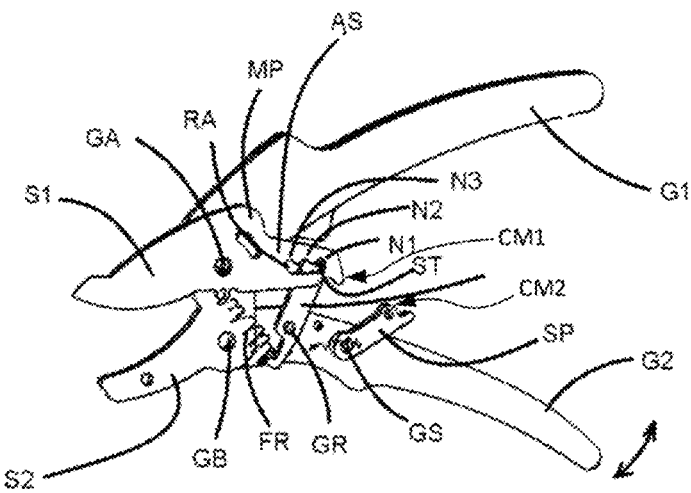

| | | | | |
|---|---|---|---|---|
| 5,950,314 | A * | 9/1999 | Chang | 30/250 |
| 6,640,442 | B2 * | 11/2003 | Lin | 30/251 |
| 6,766,581 | B2 * | 7/2004 | Nordlin | 30/251 |
| 6,829,828 | B1 | 12/2004 | Cech | |
| 7,127,819 | B1 * | 10/2006 | Huang | 30/251 |
| 7,454,837 | B2 * | 11/2008 | Shan | 30/251 |
| 7,743,509 | B2 * | 6/2010 | Macsay et al. | 30/251 |
| 7,946,039 | B2 * | 5/2011 | Erbrick | 30/251 |
| 7,966,681 | B2 * | 6/2011 | Harris | 30/251 |
| 8,024,864 | B2 * | 9/2011 | Mortensen | 30/250 |
| 8,458,912 | B2 * | 6/2013 | Linden et al. | 30/251 |
| 8,578,614 | B2 * | 11/2013 | Hernandez | 30/251 |
| 8,732,960 | B2 * | 5/2014 | Wang | 30/251 |
| 9,066,473 | B2 * | 6/2015 | Podlesny | A01G 3/021 30/251 |
| 2003/0136008 | A1 * | 7/2003 | Lin | 30/250 |
| 2004/0045174 | A1 * | 3/2004 | Nordlin | 30/194 |
| 2007/0079512 | A1 * | 4/2007 | Nelson et al. | 30/251 |
| 2010/0043237 | A1 * | 2/2010 | Linden et al. | 30/250 |
| 2011/0283545 | A1 * | 11/2011 | Wu | 30/250 |
| 2014/0041236 | A1 * | 2/2014 | Podlesny | 30/266 |

OTHER PUBLICATIONS

Chapter II International Preliminary Report on Patentability of PCT/EP2010/002673 filed May 3, 2010.
Espace.net web page showing documents cited in priority document No. DE 10 2009 019 989.6.

* cited by examiner

MANUALLY ACTUATED SCISSORS

The invention relates to manually actuated shears having a ratchet mechanism, in particular as a single-handedly actuated pruner.

Generic shears are known for example from DE 2981697 U1. For the ratchet mechanism, the known ratchet shears have a knife plate rotatable on a first handle lever about a first articulated axle. In the rear section of the knife plate, facing away from the blade with reference to the articulated axle, there is a recess with a slotted piece and several catch indentations. The second handle lever is rotatable about a second articulated axle relative to the first handle lever, and a ratchet lever is attached rotatably to the second handle lever and penetrates with a pin arranged at its other end through the slotted piece and engages in one of the catch indentations on the impact of a manual force. The several catch indentations correspond to several different ratchet stages, assigned to which in turn are different, overlapping angular ranges of the pivot movement of the knife blade from a fully open to a fully closed position. For a complete cutting process, the user must pass through several ratchet stages in that from the fully open knife position with material to be cut lying inside. Starting with a first ratchet stage, he closes the handle levers using manual force and the knife blade thereby penetrates a part of the cross-section of the material to be cut. After opening the handle levers, on a renewed closing movement of the handle levers, the pin of the ratchet lever engages in the next catch indentation and the knife blade penetrates deeper into the material to be cut on closing of the handle levers. Due to repeated opening and closing, the material to be cut is cut into further incrementally in the several ratchet stages and is finally severed completely. Due to the several ratchet stages, even thicker material to be cut can be cut single-handedly with a high force transmission.

A pruner is known from DE 1553692 C3 on which via a pivot pin, which is attached to a lever supported rotatably close to an articulation of a pivotable handle lever, and via a series of catch grooves, a variable opening width of the handle levers and a variable force transmission are selectable, wherein a larger opening width is correlated to a higher force transmission. A movable cutting jaw can be connected by means of a latch closely to a pivotable handle lever, due to which a small opening width of the handle lever arrangement is preset with a low force transmission, which permits operation with just one hand.

Manually actuated shears are known from the German specification DE 10 2007 031 145 A1 laid open to public inspection. The compressive force applied by a user to the handles of the shears is transferred via a transmission arm into a rotary movement of a shears blade. By being able to move the transmission arm into different positions, it is possible to operate the shears both in ratchet mode and with a direct cut. To this end, a complex mechanism is realised in the shears, which implements the partially automatic changeover between a ratchet mode and a direct cut. In this case, the changeover from ratchet mode to direct cut takes place automatically as soon as the blades of the shears close completely. On the other hand, pivoting the handles into opening position during a direct cut causes an automatic changeover to ratchet mode. This happens even if this movement occurs unintentionally, for example on loosening of the hand grip of the user of the shears.

The object of the present invention is to improve further the handling of ratchet shears.

The invention is described in claim 1. The dependent claims contain advantageous configurations and developments of the invention.

Due to the lever, which can be shifted manually between two functional positions and is advantageously connected permanently and undetachably to the ratchet shears, an operating mode of the shears can advantageously be selected by the user alternatively to the ratchet function. In this alternate mode, these shears can be used in the manner similar to conventional shears without a ratchet function with unchanged maximum opening width of the blade arrangement, such that the handle lever executes a direct cut in a single complete closing movement of the handle levers and at the same time causes a completely closed position of the blade arrangement from the completely open position. In each stage of the direct cut, if e.g. the manual force is not sufficient for the execution of the direct cut, the user can advantageously shift the lever manually from the second to the first functional position and thereby switch to the more force-saving ratchet operating mode for the further cutting process.

In a first embodiment, the user can manually access the lever directly to shift this between the two functional positions. In another embodiment, the lever can be coupled to an actuating element, wherein manual actuation of the actuating element causes shifting of the lever between the two functional positions. The lever can be held stably against accidental shifting in one or both functional positions by manually surmountable latching, clamping, spring action or the like.

Manual action on the lever or the actuating member by the user is advantageously possible single-handedly using the hand also gripping the handle levers, for which purpose the lever or the actuating member is arranged within reach of the fingers of the hand.

The lever and/or the actuating member can advantageously be carried for the shift movement displaceably or preferably pivotably on the shears, in particular they can be held on the second handle lever.

In the second functional position, the lever preferably transmits a manual force exerted on the handle levers from the second handle lever to a rear section, which faces away from the knife blade with reference to a first axis of rotation on the first handle lever, of a knife plate or a comparable first cutting jaw. The force transmission from the second handle lever via the ratchet lever to the knife plate is suspended. The second handle lever is held to the first handle lever, in a manner known from the prior art, rotatably about a second axis of rotation, which is located at a distance laterally from the first axis. The knife blade can act as a second cutting jaw, as a counter-knife formed as a further blade, or as an anvil, which counter-knife can be regarded as fixed with reference to the first handle lever.

The rear section of the knife plate and the lever in the second functional position are advantageously arranged in the area between the two handle levers that faces away from the knife blade with reference to its first axis of rotation. In the first functional position, the lever can advantageously lie in an indentation of the second handle lever.

The cutting force progression of conventional shears—where both cutting jaws are connected respectively to one of the handle levers and the single joint comprises only one axis of rotation—can advantageously be simulated well by the lever in its second functional position, so that the user experiences the handling as with conventional shears when the lever is located in the second functional position.

For this purpose an angle between a first longitudinal axis that is fixed with reference to the knife plate and a second longitudinal axis that is fixed with reference to the second handle lever, which are both assumed in the cutting plane, varies advantageously over the course of the cutting process of the direct cut by less than 5°, preferably less than 3°.

In an advantageous further development, it can also be provided, in the area of the contact surface of the lever on the knife plate, which surface transmits the manual force from the second handle lever via the lever to the rear section of the knife plate, to form such a contact surface on the side of the lever and/or on the side of the knife plate as a cam, along which the force-transmitting contact surface shifts in the course of the cutting process. The progression of the force transmission can be varied by such a cam dependent on the closing angle and in particular be increased in the area of a medium closing position, in which, in the case of material to be cut with a round cross-section, the cutting resistance is typically at a maximum.

When the lever is located in the first functional position, the shears can be used in the known ratchet function mode. In this case the manual force is advantageously transmitted via a ratchet lever, which is articulated on a lever articulation on the second handle lever and which engages with a driver element in respectively one of several catch positions of the ratchet structure, to the knife plate. Said lever articulation advantageously forms with the driver element and the axis of rotation of the second handle lever an obtuse-angled triangle, the shorter sides of which have a ratio of side lengths to one another of between 0.5 and 2.

The maximum opening width of the blade arrangement and/or the maximum opening width of the handle levers are advantageously independent of the respectively selected functional position of the lever.

Figure 2:
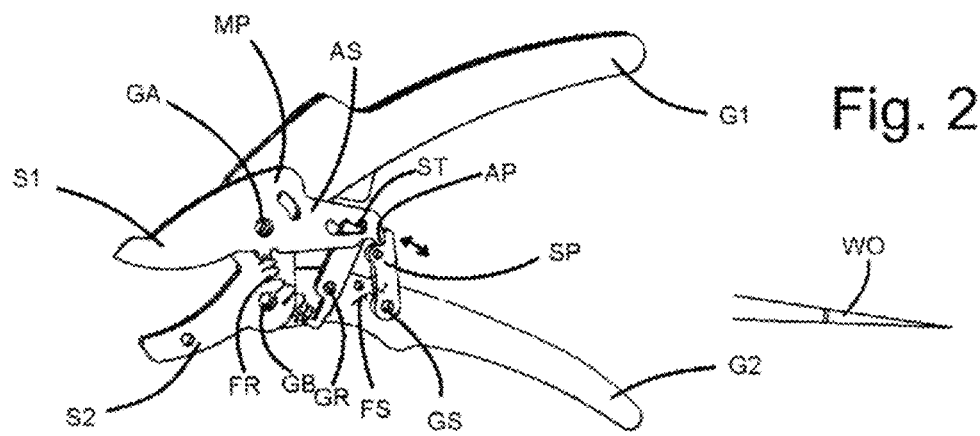
Figure 3:
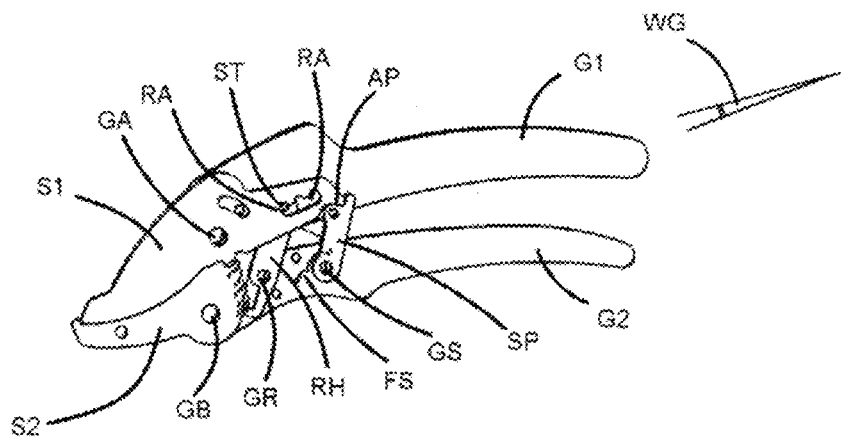
Figure 4:
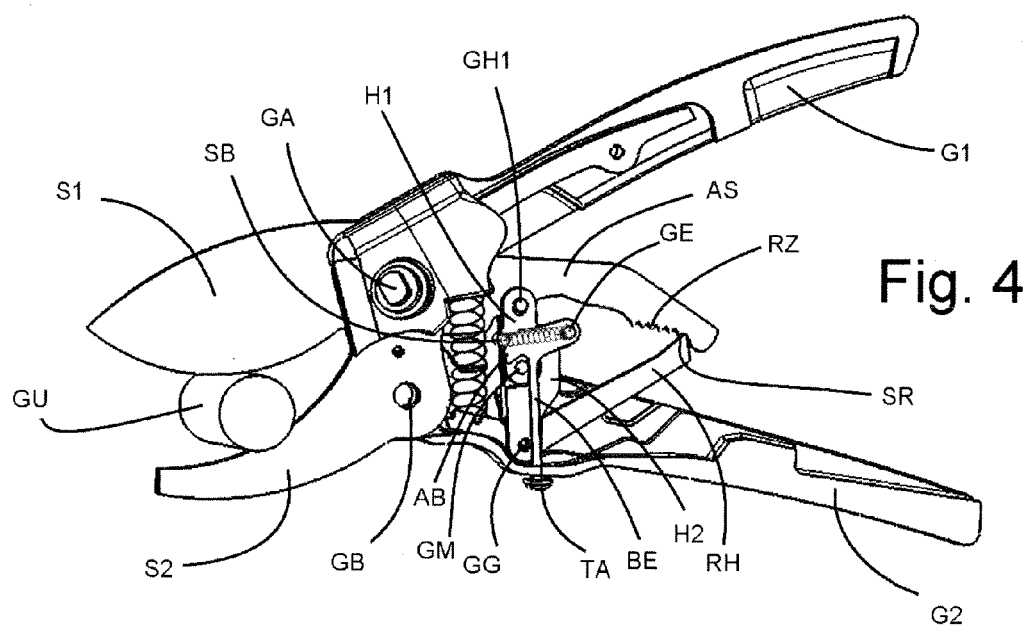
Figure 5:
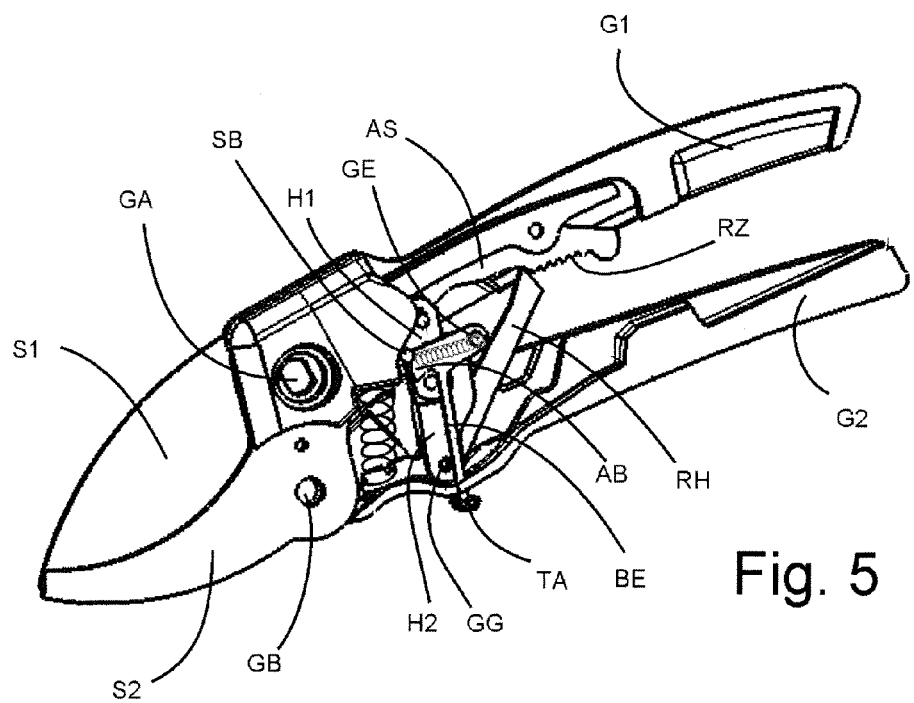
Figure 6:
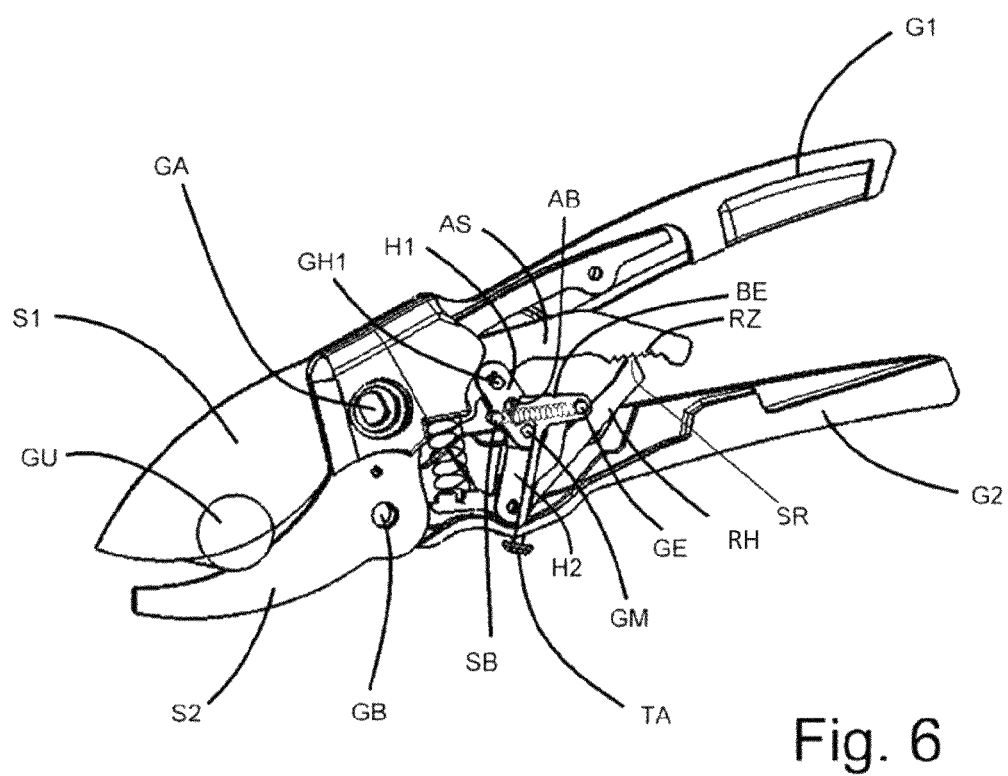

The invention is illustrated in greater detail below on the basis of preferred practical examples with reference to the figures. These show:

FIG. 1 open shears in ratchet mode,
FIG. 2 open shears in direct cut mode,
FIG. 3 closed shears in direct cut mode,
FIG. 4 a variant of FIG. 2,
FIG. 5 the variant according to FIG. 4 in the closed state,
FIG. 6 the shears according to FIG. 4 and FIG. 5 in ratchet mode.

FIG. 1 shows in a schematic representation manually actuated ratchet shears, in particular as a pruner, according to the present invention. The shears are open to the maximum width, so that the mouth of the shears between the knife blade S1 and the counter-knife S2 is open to the maximum width. In this state of opening the handle levers G1 and G2 are likewise located in the maximum separated pivoting position about an articulation GB. The counter-knife S2 and the first handle lever G1 are connected rigidly to one another and can in particular also be executed predominantly in one piece. The counter-knife S2 can be executed in particular as an anvil cutting jaw. A knife plate MP is held in a first articulation GA rotatably on the first handle lever G1. The knife plate MP contains or carries the knife blade S1 and has facing away from this with reference to the articulation GA a rear section AS, in which a recess RA with several catch grooves N1, N2, N3 is formed. The rear section AS lies in the space between the handle levers G1 and G2 that faces away from the blade arrangement formed by knife blade S1 and counter-knife S2.

The handle lever G2 is held in a second articulation GB rotatably on the first handle lever G1 or a base body connected rigidly to the first handle lever. In the following, a base body with the handle lever G1 and the counter-knife S2 may be regarded as fixed. By comparison, the knife plate MP and the second handle lever may be described as movable. The direction of movement of the knife plate with the knife blade S1 and the direction of movement of the second handle lever G2 are indicated by curved double arrows in FIG. 1.

On the second handle lever G2, facing away from the counter-knife S2 and at a distance from the second articulation GB, a ratchet lever RH is supported rotatably in an articulation GR. The ratchet lever RH is pressed by a pressure spring FR in FIG. 1 in a counter-clockwise direction against a stop. On the end of the ratchet lever pointing towards the rear section AS of the knife plate, a pin ST, which is preferably fixedly connected to the ratchet lever, engages in the recess RA in the rear section AS of the knife plate MP. In the open position shown in FIG. 1, the pin is located at the end of the recess RA facing away from the articulation GA at the first catch groove N1.

On pivoting of the second handle lever G2 due to a manual force of the user in the direction of the first handle lever G1 about the axis of rotation in the second articulation GB, the pin ST is pressed into the first catch groove N1 and the knife blade presses on a piece of material to be cut GU inserted into the cutting mouth between the blade S1 and the counter-knife S2. The manual force acting on the second handle lever G2 in the direction of the first handle lever G1 is transmitted via the articulation GR and the ratchet lever to the rear section AS of the knife plate MP and causes a closing movement of the knife blade S1 in the direction of the counter-knife S2. The pin ST remains in the first catch groove N1 on account of the pressing force. The ratchet lever RH is turned in opposition to the spring force of the pressure spring FR in a clockwise direction about the articulation GR.

The second articulation GB, the articulation GR of the ratchet lever and the pin ST as a contact point on the rear section AS of the knife plate MP form an obtuse-angled triangle with the obtuse angle at the articulation GR. The short sides of the triangle-lines between GB and GR on the one hand and GR and ST on the other-differ advantageously by a maximum factor of 2, preferably by a maximum factor of 1.5. The shorter sides of the triangle are typically of approximately the same length.

The closing movement of the second handle lever G2 towards the first handle lever G1 does not lead to complete closing of the cutting mouth even with maximum approach of the second handle lever G2 to the first handle lever G1. The material to be cut GU is only partly cut through and the knife blade S1 remains within the cross-section of the material to be cut GU when the handle lever G2 is moved away again from the first handle lever G1 on opening of the handle lever arrangement. The opening of the handle lever arrangement can take place advantageously under the effect of a spring tensioned previously on closing.

When the handle lever arrangement is opened again, the pin ST of the ratchet lever lies displaced in the direction of the articulation GA relative to the recess RA, compared with the initial situation according to FIG. 1, as the knife plate assumes another rotational position due to the partial cutting of the blade S1 into the material to be cut GU. On renewed closing of the handle lever arrangement, the pin ST engages in the next catch groove N2 and causes a further closing movement of the knife blade S1 in the direction of the counter-knife S2, wherein even this second actuation process of the handle lever arrangement does not normally lead to complete severing of the material to be cut GU. Following renewed opening of the handle lever arrangement, closing movement of the handle lever arrangement with engagement of the pin ST in the third and last catch groove N3 and complete closing of the handle lever arrangement, the blade arrangement assumes a completely closed position, in which the material to be cut GU is completely severed. Following opening of the handle lever arrangement, the blade arrangement then assumes the initial position sketched in FIG. 1 again. In the case of more than three ratchet stages in particular, ratchet stages can also be skipped.

The cutting process in ratchet mode described above is known for example from the prior art cited at the beginning and from commercially available ratchet shears.

In the case of the shears according to the invention, a lever is additionally provided, which is executed in the example according to FIG. 1 as lever SP. The lever SP is held pivotably about a further articulation GS on the second handle lever, as indicated by the further curved double arrow (see FIG. 2).

In the situation illustrated in FIG. 1, the locking lever SP is located in the first functional position, in which the shears can be operated in ratchet mode as described. By pivoting the locking lever SP from the position shown counter-clockwise about the articulation SG, the locking lever SP is brought into the second functional position shown in FIG. 2, in which first cam CM1 of the rear section AS of the knife plate MP and a second cam CM 2 the locking lever SP rest against one another on an approximately punctiform contact surface AP or are at least opposite one another. Contact is achieved at the latest when the second handle lever G2 is pivoted about the articulation GB in the direction of the first handle lever G1 under the influence of the manual force of a user. In a closing movement of the handle lever arrangement, the manual force exerted on the second handle lever is transmitted via the articulation GS and the locking lever SP as well as via the contact surface AP to the rear section AS of the knife plate and causes a rotary movement of this about the articulation GA that closes the cutting mouth. In this closing movement, no pressure force is transmitted from the second handle lever to the knife plate via the ratchet lever RH. The pin ST can move largely force-free within the recess RA on the dosing movement. Any forces on account of the spring loading of the ratchet lever are negligible compared with the manual force used.

In contrast to the first closing movement described for FIG. 1 with incomplete closing of the cutting mouth in a closing movement with the locking lever located in the position shown in FIG. 2 with maximum approach of the second handle lever G2 to the first handle lever G1 about the second articulation GB, the knife blade S1 is moved completely as far as the counter-knife and the cutting mouth closed completely and thus material to be cut inserted into the cutting mouth prior to the start of the cutting operation is completely severed. A complete cutting process described as a direct cut thus takes place with only one closing movement of the handle lever arrangement, as with conventional shears without a ratchet function.

In FIG. 3, the corresponding closed position of the shears following completion of the cutting process is shown. The pin ST of the ratchet lever has shifted during the cutting process within the recess RA to the third catch groove N3 but without making any force contribution to closing of the blade arrangement. The lever SP has experienced pivoting in a clockwise direction about the articulation GS in the closing process. In order to hold the lever in the second functional position corresponding to the direct cut mode of the shears on renewed opening of the handle lever arrangement, which is connected via the ratchet lever and the pin ST also automatically to opening of the blade arrangement, a spring FS can act on the lever SP in one of the known configurations.

The lever holds the catch structure formed in the rear section at a distance from the second handle lever during the direct cut process variable and greater than the distance of the catch structure from the second handle lever in ratchet mode with respectively corresponding closing positions of the handle lever arrangement. The distance of the contact surface AP from the articulation GS is advantageously at least 75% of the distance of the articulation GA from articulation GB.

In the direct cut mode, the progression of the force transmission during the execution of the closing process of the handle lever arrangement and/or blade arrangement can advantageously be approximated to the progression of the force transmission of conventional shears with a direct rigid connection of knife plate MP and second handle lever and only one articulation in the shears' single joint. It can be advantageous for this if a first imaginary longitudinal axis, which is fixed relative to the knife plate, and a second imaginary longitudinal axis, which is fixed relative to the second handle lever G2, only vary slightly in their angular orientation during the cutting process. Let said imaginary longitudinal axes both be assumed in the cutting plane of the shears lying perpendicular to the axes of rotation of the articulations GA, GB. The position of the longitudinal axes within the knife plate MP and the second handle lever G2 is arbitrary in itself. For example, for a first longitudinal axis that is fixed with reference to the knife plate MP, a straight line connecting the articulation GA and the contact point AP can be assumed and for the second longitudinal axis that is fixed with reference to the second handle lever, a straight line connecting the second articulation GB and the articulation GS of the lever SP can be assumed. These two straight lines enclose an angle WO of approx. 6.2° in the open position of the shears according to FIG. 2 and an angle WG of approx. 6.1° in the closed position of the shears according to FIG. 3. The variation of such an angle between two longitudinal axes of said type over the course of the cutting process advantageously comes to no more than 5°, preferably no more than 3°. The straight lines through the points GA, AP and GB, GS chosen above for the arbitrarily selectable longitudinal axes advantageously enclose an angle that does not exceed 15°.

FIG. 4 shows in a representation corresponding to FIG. 2 a modified embodiment. The ratchet mechanism in this case is executed with a tip SR at the end of the ratchet lever RH and a toothed catch structure RZ on the rear section AS of the knife plate, which has no influence in principle on the basic function of the catch mechanism in ratchet mode. At most, the several stages provided in the catch toothing RZ shown can be skipped more easily, which is also the case, however, with the catch grooves N1 to N3 according to FIG. 1. For this reason the ratchet mode of the shears shown in FIG. 4 shall not be described further.

In the example outlined in FIG. 4, a double lever arrangement with two partial levers H1, H2, which are connected flexibly to one another in a central articulation GM, has been chosen as lever. The partial lever H1 is connected flexibly in an articulation GH1 to the rear section AS of the knife plate, the partial lever H2 to the second handle lever G2 in an articulation GG. In this case the articulation GG is used jointly for the partial lever H2 and the ratchet lever RH. In the second functional position of the lever shown in FIG. 4, the partial levers H1 and H2 are located in an elongated position, in which the articulations GG, GM and GH1 lie substantially in a line, wherein the articulation GM can also be offset slightly to the left of the connecting line from GG to GH1. An actuating element BE is connected in an articulation GE to the second partial lever H2. This articulation GE is drawn to the left via a spring FB and presses the lever arrangement, in particular the partial lever H1, against a stop on the left side, whereby the elongated position of the levers H1, H2 is stabilised.

In the direct cut mode shown in FIG. 4 with stably elongated lever arrangement H1, H2, in a complete closing movement of the second handle lever G2 towards the first handle lever G1, the knife blade S1 is also pivoted completely as far as the counter-knife S2 and the material to be cut is completely severed in one move by direct cutting.

Opposite a stop element SB, which can be executed for example as a pin and on which the spring FB can be hung, the actuating element has an inclined counter-contact surface AB. The actuating element projects beyond the underside of the second handle lever G2 and can be displaced further into the handle lever G2 via a button TA or the like fitted on the protruding part by finger action of the user's hand gripping the handle lever arrangement. In the case of such displacement, the actuating element BE is displaced to the right by sliding of the inclined surface AB onto the stop element SB with its upper part attached flexibly to the articulation GE in FIG. 4 and the lever arrangement with levers H1, H2 folds into the articulation GM.

Such a situation is shown in FIG. 6, where it is assumed that the user has partly cut through the material to be cut GU in the direct cut mode of the type shown in FIG. 4, but then wanted to switch to the force-saving ratchet mode. Following folding of the lever arrangement H1, H2 at the central articulation GM, the lever arrangement H1, H2 transmits virtually no pressure forces from the second handle lever G2 to the knife plate. A transmission of force now takes place via the ratchet lever RH, which lies with its end tip in an intermediate position within the catch toothing RZ. The further cutting process takes place in ratchet mode with multiple repeated closing and opening of the handle lever arrangement if applicable, until the blade arrangement is completely closed and the material to be cut GU is severed.

The lever arrangement with partial levers H1, H2 is elongated again in each case on opening of the handle lever arrangement under the influence of the spring FB. In multiple opening and closing in ratchet mode, the button TA must remain pressed, therefore, or the folded position of the levers H1, H2 must be guaranteed in some other way. For example, the button TA can be latchable in a pressed position.

In an embodiment that is not shown, the lever can also be executed fixed in the second functional position, thus without the flexible connection of the lever SP to the handle lever G2 or the flexible connections of the levers H1, H2 to the handle lever G2 and the knife plate MP. Since the knife plate shifts relative to the second handle lever during the closing process, the contact surface between lever and rear section of the knife plate also shifts during the closing process. Such a shift can be achieved by a sliding relative movement, which can, however, lead to friction losses and possible abrasion on the surfaces affected, which transmit the total manual force applied by the user transverse to the direction of movement of the sliding movement. In the preferred embodiment, a rotatably supported roller is provided on at least one side of the force-transmitting contact, thus either on the side of the rear section AS of the knife plate MP or on the side of the lever. The counter-surface on which the roller rolls, or which forms a contact for a sliding movement, can advantageously be formed by a specifically shaped cam, in the configuration of which the progression of the force transmission can be modified compared for example with a course of the blade arrangement according to FIG. 2 and FIG. 3, in order to achieve an increase in force transmission, for example in a medium closing position with maximum diameter of the material to be cut, on the cutting edge of the cutting knife.

The features indicated above and in the claims as well as those deducible from the illustrations are advantageously realisable both singly and in different combination. The invention is not restricted to the practical examples described, but can be modified in various ways in the scope of the skill of the art.

The invention claimed is:

1. Manually actuated shears comprising:
   a first handle lever having a counter-knife rigidly fixed at a distal end of the first handle lever;
   a knife plate with a cutting edge pivotally connected to the first handle lever at a first articulated axle and configured to rotate about the first articulated axle, wherein the knife plate and the counter-knife define a blade arrangement;
   a second handle lever pivotally connected to the first handle lever at a second articulated axle and configured to rotate about the second articulated axle;
   a ratchet lever pivotally connected to the second handle lever and having a pin located at a distal end of the ratchet lever, the pin engaging a recess located in rear end of the knife plate defining a plurality of catch grooves corresponding to various stages of the ratchet lever; and
   a locking lever that is operably connected to the second handle lever,
   wherein the knife plate of the blade arrangement is movable between a fully opened and fully closed position,
   wherein the locking lever is configured to be shifted manually between a first functional position in which the locking lever is spaced from the knife plate and a second functional position in which the locking lever contacts the knife plate and the locking lever is configured to be held in the second functional position by a spring,
   wherein when the locking lever is in the first functional position, the ratchet lever is engaged with the knife plate such that the pin of the ratchet lever operably interacts with the plurality of catch grooves such that force exerted on the first handle lever and the second handle lever is transmitted to the blade arrangement and moves the knife plate of the blade arrangement between the fully open and the fully closed position, wherein the various stages of the ratchet lever are assigned to corresponding closing angle ranges defined by a position of the pin in relation to the plurality of catch grooves and the knife plate is movable in relation to the counter-knife between the fully open and the fully closed position through repeated opening and closing movements of the first and second handle levers to respectively insert the pin in different ones of the plurality of catch grooves corresponding to the various stages of the ratchet lever, and
   wherein when the locking lever is in the second functional position, the locking lever couples the first handle lever and the second handle lever with the blade arrangement such that force exerted on the first and second handle lever is transmitted to the blade arrangement through the locking lever and the knife plate of the blade arrangement is movable between a fully open and fully closed position with a single closing movement of the first and second handle levers.

2. Manually actuated shears according to claim 1,
wherein a maximal opening width of the blade arrangement is defined as a distance between the cutting edge of the knife plate and counter-knife when the knife plate of the blade arrangement is in the fully open position,
wherein a maximal opening width of the first and second handle levers is defined as a distance between the first and second handle levers when the knife plate of the blade arrangement is in the fully open position, and
wherein the maximal opening width of the blade arrangement is the same when the locking lever is in the first functional position or the second functional position and a maximal opening width of the first and second handle levers is the same when the locking lever is in the first functional position or the second functional position.

3. Manually actuated shears according to claim 1, wherein the locking lever is coupled with an actuating element and is shiftable between the first and second functional positions by manual actuation of the actuating element.

4. Manually actuated shears according to claim 1, wherein in the second functional position, the locking lever, on the movement of the first and second handle levers and a movement of knife plate of the blade arrangement linked with the locking lever, is braced pivotably about the first articulated axle having a first pivot axis on the second handle lever and a contact surface on the rear section of the knife plate.

5. Manually actuated shears according to claim 1, wherein in the second functional position, the locking lever braces the rear section of the knife plate that faces away from the first articulated axle against a manual force on the second handle lever.

6. Manually actuated shears according to claim 1, wherein the locking lever extends into a space between the first and second handle levers that faces away from the cutting edge.

7. Manually actuated shears according to claim 1, wherein in the first functional position, the locking lever lies in an indentation of the second handle lever.

8. Manually actuated shears comprising:
a first handle lever having a counter-knife rigidly fixed at a distal end of the first handle lever;
a knife plate with a cutting edge pivotally connected to the first handle lever at a first articulated axle and configured to rotate about the first articulated axle, wherein the knife plate and the counter-knife define a blade arrangement;
a second handle lever pivotally connected to the first handle lever at a second articulated axle and configured to rotate about the second articulated axle;
a ratchet lever pivotally connected to the second handle lever and having a pin located at a distal end of the ratchet lever, the pin engaging a recess located in rear end of the knife plate defining a plurality of catch grooves corresponding to various stages of the ratchet lever; and
a locking lever that is operably connected to the second handle lever,
wherein the knife plate of the blade arrangement is movable between a fully opened and fully closed position,
wherein the locking lever is configured to be shifted manually between a first functional position in which the locking lever is spaced from the knife plate and a second functional position in which the locking lever contacts the knife plate and the locking lever is configured to be held in the second functional position by a biasing member,
wherein when the locking lever is in the first functional position, the ratchet lever is engaged with the knife plate such that the pin of the ratchet lever operably interacts with the plurality of catch grooves such that force exerted on the first handle lever and the second handle lever is transmitted to the blade arrangement and moves the knife plate of the blade arrangement between the fully open and the fully closed position, wherein the various stages of the ratchet lever are assigned to corresponding closing angle ranges defined by a position of the pin in relation to the plurality of catch grooves and the knife plate is movable in relation to the counter-knife between the fully open and the fully closed position through repeated opening and closing movements of the first and second handle levers to respectively insert the pin in different ones of the plurality of catch grooves corresponding to the various stages of the ratchet lever, and
wherein when the locking lever is in the second functional position, the locking lever couples the first handle lever and the second handle lever with the blade arrangement such that force exerted on the first and second handle lever is transmitted to the blade arrangement through the locking lever and the knife plate of the blade arrangement is movable between a fully open and fully closed position with a single closing movement of the first and second handle levers.

9. Manually actuated shears according to claim 8, wherein in the first functional position, the locking lever lies in an indentation of the second handle lever.

10. Manually actuated shears according to claim 8, wherein the locking lever extends into a space between the first and second handle levers that faces away from the cutting edge.

11. Manually actuated shears according to claim 8, wherein in the second functional position, the locking lever braces the rear section of the knife plate that faces away from the first articulated axle against a manual force on the second handle lever.

* * * * *